United States Patent Office 2,773,862
Patented Dec. 11, 1956

2,773,862

PROCESS OF STABILIZING PHOSPHORUS SULFIDE-OXYGEN-CONTAINING ORGANIC COMPOUND REACTION PRODUCTS

John M. Musselman, Brecksville, Ohio, assignor to The Standard Oil Company, Cleveland, Ohio, a corporation of Ohio No Drawing. Application December 30, 1955,
Serial No. 556,460

4 Claims. (Cl. 260—125)

This invention relates to a process of reacting oxygen-containing organic compound-phosphorus sulfide reaction products with sulfur dioxide to stabilize them against generation of hydrogen sulfide.

Phosphorus sulfide-organic reaction products are now well known lubricating oil additives. These compounds are reported in the literature to impart extreme pressure properties to lubricating oils and greases, and to increase their load carrying capacity and film strength. These additives are also claimed to check oxidation of the lubricating base, and prevent sludge, carbonization and lacquer formation on cylinder and piston walls of internal combustion engines operating under high temperatures and pressures; they may also inhibit corrosion.

However, many additives which are reaction products of oxygen-containing organic compounds and phosphorus sulfide, although their engine use properties are usually excellent, have the disadvantage of generating sufficient amounts of hydrogen sulfide on storage or in use to be unpleasant. It has been demonstrated that this hydrogen sulfide actually is not a by-product of the reaction in which the additive is prepared, but is formed by chemical reaction or decomposition involving the additive in some way, and that this generation is expedited by heat and in the presence of moisture. Hydrogen sulfide is generated after all of the hydrogen sulfide remaining after preparation of the reaction product is removed or destroyed.

In order to satisfy industry requirements for stability against generation of hydrogen sulfide, phosphorus sulfide-organic additives should not liberate hydrogen sulfide after storage or use for 72 hours at 150° F. The oxygen-containing organic compound-phosphorus sulfide additives presently available in commerce normally do not meet this requirement. An odor of hydrogen sulfide is offensive at concentrations above 3 p. p. m. A number of commercial lubricating oils taken at random containing a high concentration of an oxygen-containing organic compound-phosphorus sulfide additive have been found to exceed this.

In accordance with the present invention, organic compound-phosphorus sulfide additives are stabilized against generation of hydrogen sulfide by reaction with sulfur dioxide, desirably in the presence of water, at a temperature of at least 150° F. In this reaction hydrogen sulfide present in the additive is destroyed, and in addition the additive is so changed chemically that hydrogen sulfide is no longer generated under the test conditions described hereinafter.

In this reaction free hydrogen sulfide present in the oil and/or the additive is thought to be removed in accordance with the following chemical equation:

$$2H_2S + SO_2 \rightarrow 3S + 2H_2O$$

This is not the only reaction which takes place, since not only is free hydrogen sulfide removed, but also the additive is stabilized against further generation of hydrogen sulfide for periods up to 500 hours or more, as measured by the hydrogen sulfide stability test. In this reaction, it is thought that the sulfur dioxide reacts with mercaptan (SH) linkages in the phosphorus sulfide reaction product, converting adjacent pairs of SH linkages to disulfide (S—S) linkages. Disulfide linkages are not reactive with water, and therefore this conversion prevents formation of hydrogen sulfide in the presence of heat and/or moisture. Mercaptan linkages are well known to be unstable under such conditions and are lost with the production of hydrogen sulfide.

This theory is in accord with the available evidence. The reaction in accordance with the invention does not increase the sulfur content of the additive substantially. The sulfur content of the stabilized additive is not more than about 1.5% higher than that of the unstabilized additive. In many cases, the sulfur content is actually reduced by the process. This shows that the process of the invention cannot be a sulfurization. Absence of a substantial change in sulfur content is understandable if the sulfur dioxide only links —SH linkages to form —S—S— linkages, since this of course does not involve addition of sulfur to the molecule.

However, inasmuch as the structure of phosphorus sulfide-oxygen-containing organic compound reaction products has not been completely elucidated, this reaction is only a hypothesis. It has not yet been proved. A definite conclusion that can be made is that the sulfur dioxide reacts with latent hydrogen sulfide-producing components of the additive, and stabilizes them so that hydrogen sulfide is no longer generated within the requirements of the hydrogen sulfide stability test.

In the hydrogen sulfide stability test, the additive's ability to generate hydrogen sulfide is determined as an 8% solution in an SAE No. 20 lubricating oil by storing the solution in a closed container at 150° F. until hydrogen sulfide is detected by moistened lead acetate paper held over the oil. This paper will turn gray or black if hydrogen sulfide is present in a concentration of about 1.0 p. p. m. over the oil. The time required before hydrogen sulfide is liberated is reckoned as hours to failure, and to pass the test the time must be at least 72 hours. The storage temperature of 150° F. is the maximum that would be encountered under most conditions of handling and distribution.

The 16 hour test is more severe than the hydrogen sulfide stability test. The treated additive product is heated at 150° F. for 16 hours, and the $H_2S$ concentration in p. p. m. determined by removing the hydrogen sulfide from the oil with nitrogen and passing the resulting gas mixture through ammoniacal zinc sulfate solution. The precipitated zinc sulfide is determined iodometrically. A value of less than 0.1 p. p. m. in this test indicates that an 8% solution of the additive in a motor oil will operate at least 500 hours before failure under the conditions of the hydrogen sulfide stability test.

Oxygen-containing organic compound-phosphorus sulfide additives are well known to the art and per se form no part of the present invention, which relates only to the treatment thereof with sulfur dioxide. However, the following brief description is given of these reaction products for the aid and convenience of those skilled in the art in understanding the additives to which the present invention is applicable.

Phosphorus sulfide oxygen-containing organic compound additives may be made with direct admixture of the reactants or, if desired, in the presence of a diluent oil which may or may not subsequently be removed. In either case, the entire reaction mixture which is obtained is referred to herein as the additive. A lubricating oil may be used as the diluent. The term "diluent" is used for convenience, but it is not intended to imply that the diluent oil is inert; it will take part in the reaction if it is reactive with the phosphorus sulfide under the reaction conditions.

The additives of the present invention are primarily intended for use by addition to lubricating oils. Such oils after refinement, such as by solvent extraction and solvent dewaxing, have mixed with them a small amount of the additive. It has been found in practice that the additives can be made much more soluble in lubricating oil if they are prepared in a lubricating oil. Many of the reaction products reacted with sulfur dioxide in accordance with the present invention, if made without an oil present, can only be dissolved with difficulty, if at all, in lubricating oil. Their solubility is greatly enhanced if the reaction product in the first instance is prepared in the presence of an oil. This procedure is preferred.

The reaction is usually complete in about 10 hours or less, generally 1 to 2 hours. The reaction time is a function of temperature, the amount of the sulfide that is to react, the degree of subdivision of the reactants, the efficiency of mixing, etc.

The oxygen-containing organic compound or mixtures thereof may be reacted with the phosphorus sulfide or a mixture of phosphorus sulfides in ratios from 5 to about 60% by weight of the phosphorus sulfide. Generally about 10 to about 50% is the usual amount that will be used, depending upon the molecular weight of the oxygen-containing organic compound, and about 10 to 20% is especially desirable.

Phosphorus pentasulfide is preferred, although other phosphorus sulfides, such as phosphorus sesquisulfide and phosphorus trisulfide, or mixtures thereof with phosphorus pentasulfide, may be employed. Phosphorus pentasulfide is least expensive and readily available, and for this reason is used in the illustrative examples.

The oxygen-containing organic compound may contain oxygen in the form of a hydroxyl, carbonyl, carboxyl, or ether group, or a mixture thereof.

Alcohols, carbonyl compounds such as ketones, aldehydes, and amides, carboxyl compounds such as esters and acids, and ethers are typical classes of oxygen-containing organic compounds. The compounds can contain a plurality of functional oxygen groups, i. e., polyalcohols, polyacids, polyamides, polyethers, polyketones, polyesters, and polyaldehydes. Many mixed classes also are available, such as hydroxy acids, esters, ethers, amides, ketones, and aldehydes. Usually from 1 to 3 like or unlike functional oxygen groups are sufficient although higher polyfunctional compounds could be utilized for special effects. Saturated and unsaturated aliphatic and cycloaliphatic compounds, aromatic compounds, and mixed aliphatic-aromatic, aliphatic-cycloaliphatic and cycloaliphatic-aromatic compounds are within the scope of the invention. Desirably, the compound has a rather high molecular weight and a boiling point above the reaction temperature, properties usually found in compounds of at least eight carbon atoms. However, if the substance has a low boiling point, the reaction may be conducted under pressure, if desired. Preferably compounds having twelve or more carbon atoms, and generally not over twenty carbon atoms are employed, although compounds of up to 52 carbon atoms or more are suitable. Also, halogenated derivatives of any of these classes of compounds are suitable.

Illustrative of some conveniently applicable ester materials are: degras, lanolin, sperm oil, beeswax, ester waxes, butyl stearate, ethyl lactate, methyl oleate, methyl palmitate, butyl ricinoleate, butyl phthalate, methyl stearate, methyl dichlorostearate, methyl chloro-naphthenate, coconut oil, palm oil, babassu oil, hydrogenated linseed, coconut and other vegetable and fatty oils.

A few ethers are di (dodecyl) ether, methyl stearyl ether, ethylene glycol monoethers and ethylene glycol chlorohydrin.

Typical acids are palmitic acid, abietic acid, rosin, modified rosin, myristic acid, naphthalic acid, dichloropalmitic acid, naphthoic acid, benzoic acid, naphthenic acids, hydroxystearic acid, dihydroxybenzoic acids, hydroxynaphthenic acids, dihydroxystearic acid, chlorobenzoic acid, dichlorodihydroxystearic acid, lactones, oxidized petroleum fatty acids or other oxygen-containing or acidic petroleum products, as oxidized wax, kerosene, gas oil or other oxidized petroleum oil.

A large variety of aliphatic amides are suitable. The preferred amides are those which contain either an amido hydrogen (a hydrogen directly connected to the nitrogen), or an olefinic double bond, or both. Typical amides are those which correspond to a carboxylic acid obtainable from natural products, such as dodecanoyl amide, tetradecanoyl amide, octadecanoyl amide, eicosanoylamide and the corresponding unsaturated amides containing one or more olefinic double bonds in the molecule. The amides may contain a lower aliphatic substituent for one or both of the amido hydrogens in many instances. These may be represented by the formula

where R is an aliphatic hydrocarbon radical and X and $X_1$ are hydrogen and/or a lower aliphatic substituent, such as methyl and ethyl up to amyl. The amide stock used may be a mixture of amides of different molecular weight or different degrees of unsaturation. It need not be pure and amounts of other amides may be present.

Typical alcohols which may be used include lauryl alcohol, stearyl alcohol, alcohols derived from coconut oil, sperm oil, palm oil and cottonseed oil, degras, oleyl alcohol, and octyl alcohol.

Representative ketones are methyl dodecyl, xylyl heptadecyl, dioctadecyl, diheptadecyl, ethyl heptadecyl, propyl heptadecyl, and hydroxyphenyl heptadecyl ketones. Palmitone (commercial dipalmityl ketone) is a readily available higher ketone. The ketone stock may be a mixture of the ketones of different types of different molecular weights or both.

The compound used in forming the reaction product should be selected with reference to the use of the final composition and properties desired in it, e. g., to give a reaction product having oil solubility or dispersibility.

It will be understood that up to 90% of the oxygen-containing organic compound may be replaced in part by a nonoxygen-containing organic compound reactive with phosphorus sulfide, such as saturated and unsaturated aliphatic amines, and aromatic and unsaturated aliphatic and cycloaliphatic hydrocarbons. Large numbers of these compounds have been used in the preparation of mixed phosphorus sulfide-organic reaction products, and are therefore well known to the art.

Amines of higher molecular weight may be used, such as primary and secondary saturated and unsaturated aliphatic amines and unsaturated tertiary aliphatic amines, such as octadecyl amine, dioctadecyl amine, octadecynyl amine, hexadecyl amino, octadecynyl dimethyl amine and dodecyl amine. Preferably the amine has an aliphatic radical of at least ten carbon atoms, the other substituent, in the case of a secondary or tertiary amine, having from one to five carbon atoms.

Other desirable substitutes for a part of the oxygen-containing organic compound are unsaturated hydrocarbons having from 6 to 25 carbon atoms and one or more pairs of double or triple bonded carbon atoms. High molecular weight olefin polymers having a molecular weight above 150 up to about 50,000 are very useful. One such olefin polymer is the so-called "motor polymer" or "reduced motor polymer" which is usually made from $C_3$ and $C_4$ olefins by nonselective polymerization, e. g., with a phosphorus acid type catalyst. Motor polymer boils in the range from 80 to 500° F. with a major portion boiling in the range from 120 to 400° F. A polymer gasoline fraction may be removed therefrom by fractional distillation to the 250° F. cut point, and this fraction is called "reduced motor polymer." Its average molecular weight is about 145, and it preferably contains a major amount of branched chain olefins boiling below 600° F.

Another polyolefin which is especially useful is one which improves the viscosity index of lubricating oil, which has a molecular weight of about 2,000 to 100,000 and which is substantially saturated. A commercially available material of this type is known as "Paratone." This is a polyisobutylene polymer having a molecular weight from 10,000 to 20,000, in solution in a lubricating oil in an amount to give a viscosity of about 3,000 SSU at 210° F.

Terpenes and turpentine are typical cycialiphatic and mixed aliphatic-cycloaliphatic-aromatic hydrocarbons, of which p-cymene, camphorene, cyclene, bornylene, camphene, α-pinene, sylvestrene, dipentene and 1,8-terpin are examples.

The reaction of the individual reactants selected from the above classes may be carried out in the presence or absence of air or in an inert atmosphere such as nitrogen or hydrogen sulfide. It may also be carried out under pressure.

The reaction temperature varies with the organic compound and is readily ascertained. The optimum is in the range of 225 to 600° F., above thiophosphate formation, although a higher temperature which is below that at which the reaction product would be decomposed could be used. A temperature of at least 250 to 350° F. is preferred in many cases.

The final reaction mass is preferably centrifuged, filtered or settled and decanted in order to remove the by-product, sludge or other insoluble material. Any excess of a volatile constituent or diluent may be removed by distillation. If desired, the final product may be solvent-extracted with a suitable solvent, such as liquid propane, isopropyl alcohol, acetone or other solvent known in the art, or contacted with an absorbent, such as activated charcoal, silica gel, activated clay and the like.

Although the process of the invention does not involve a sulfurization, it is applicable to sulfurized additives. An element of the sulfur family can be incorporated into the additive by conventional sulfurization techniques. This sulfur can be incorporated by adding elemental sulfur or a compound which yields sulfur, such as by treating the reaction product therewith or treating a derivative of the reaction product therewith.

If additional reacted sulfur is to be present in the additive, about 0.01 to 2.0 and preferably 0.1 to 1.0 gram atomic weights of sulfur per mole of the phosphorus sulfide is used. Additional reacted sulfur may be incorporated simultaneously with or after the formation and cooling of the primary reaction product. If added afterwards, the mass is maintained at about 200 to 300° F. for from a few minutes to several hours, and preferably about one hour. Selenium and tellurium function much in the same way as sulfur in this respect. Alternatively, the sulfur can be added to the metal, nitrogen base or ester derivative.

As is well known, phosphorus sulfide-organic compound reaction products may also be utilized in the form of their metal, nitrogen base or ester derivatives, or mixtures of these derivatives, with the original reaction product. These derivatives are formed from compounds capable of replacing an acid hydrogen atom in the phosphorus sulfide-organic reaction product, although the formation of the above derivatives may itself involve replacement of an acid hydrogen in the reaction product.

The metal derivatives may be formed from one or more metal compounds, such as their sulfides, oxides, hydroxides, carbides and cyanamides. The preferred metals are those of groups I, II and III of the periodic table, such as potassium, sodium, calcium, magnesium, beryllium, zinc, barium and aluminum. For some purposes, the heavier metals are especially useful, such as chromium, cadmium, tin, lead, antimony, bismuth, arsenic and the like.

The metal derivatives may be formed by reacting the phosphorus sulfide-organic reaction product with the corresponding metal compound at temperatures in the range of about 100 to about 350° F., a temperature in the range of about 180 to 250° F. being preferred.

When a metal, nitrogen base or ester derivative containing subsequently added reacted sulfur is desired, there are two alternative ways of producing it: (1) the original or primary reaction product can be reacted with an element of the sulfur family and this reaction product then converted into the metal derivative, or (2) the primary reaction product can first be converted into the metal derivative and this derivative then reacted with an element of the sulfur family.

From about 0.2 to about 6.0 equivalents of a metal compound may be used per mole of the sulfide used in the sulfide-derived reaction product, preferably about 1.0 to about 3.0 equivalents.

The metal additive compounds, especially those fully saponified so as to have a high metal content, may be mixed with oils to form greases, with or without conventional soaps, and in such cases the metal additive compounds serve to thicken the oil as well as to stabilize it and impart a detergent action.

The nitrogen base derivatives may be prepared by reacting the primary or sulfur-containing reaction product with one or more basic nitrogenous compounds, such as ammonia, organic amines or heterocyclic bases. Generally, ammonia and the gaseous or liquid organic amines are preferred, such as methyl amine, diethyl amine, butyl amine, trimethyl amine, ethyl propyl amine, and isopropyl amine. Polyamines may also be used. From about 0.25 to about 6.0 equivalents of the nitrogen base may be used per mole of the phosphorus sulfide in the primary reaction product, preferably about 1 to about 4 equivalents.

The ester derivatives may be prepared by reaction of the primary reaction product with one or more alcohols, or thioalcohols, i. e., alkyl, aryl, cycloalkyl and heterocyclic compounds containing a hydroxyl or thiohydroxyl group. The term "ester derivative" is used herein in its generic sense to include esters of any of the above types of compounds. The ester derivatives may be formed by reacting the primary reaction product with the hydroxy or thiohydroxy compound at temperatures in about the range of 100 to 350° F., a temperature of 180 to 280° F. being preferred. From about 0.2 to about 6.0 equivalents of the esterifying agent may be used per mole of the phosphorus sulfide in the primary reaction product, preferably about 1.0 to about 4.0 equivalents.

It is beneficial to have water present in the reaction mixture when forming the metal or nitrogen base derivative, and this may be introduced as water of crystallization or as a hydrate of the metal compound, or of the nitrogen base, or it may be introduced separately.

A plurality of metals or nitrogen bases or of esterifying agents or mixtures of any two or more thereof may be used. If the amount of the metal nitrogen base or alcohol or combinations thereof is small, the final product may be a mixture of the initial reaction product and the metal nitrogen base or ester derivative.

Obviously the description herein of the preparation of phosphorus sulfide-oxygen-containing organic compound reaction products cannot be exhaustive in view of space limitations. Further details of the preparation of these reaction products will be found in the following patents, which are well known to those skilled in the art: 2,142,998, Chittich; 2,211,231, Henderson; 2,211,306, Whittier; 2,235,860, Williams; 2,242,260, Prutton; 2,257,750, Lincoln; 2,257,751, Lincoln; 2,261,047, Asseff; 2,308,427, Roehner; 2,329,436, Cook; 2,337,868, Burwell; 2,355,106, Prutton; 2,356,074, May; 2,357,346, Musselman; 2,358,305, Cook; 2,361,746, Cook; 2,361,957, Musselman; 2,362,624, Gaynor; 2,364,283, Freuler; 2,364,284, Freuler; 2,365,209, Musselman; 2,368,000, Cook; 2,373,094, Berger; 2,375,060, Williams; 2,375,061, Williams.

The above as well as other patents will be found briefly discussed in the article "Use of phosphorus sulfide organic reaction products as 'lube oil additives,'" by George G. Pritzker, in National Petroleum News, December 5, 1945 (vol. 37, No. 49).

In accordance with the invention the phosphorus sulfide-oxygen-containing organic compound additive mixture is reacted with sulfur dioxide gas under conditions such that the sulfur content of the resulting additive is not more than about 1.5% higher than that of the starting additive.

The reaction proceeds at an elevated temperature, generally in excess of 150° F. and preferably in excess of 175° F. The upper limit is determined by the stability of the reaction product being treated and is not critical.

The reaction time is a function of the temperature, sulfur dioxide concentration and pressure, rate of mixing and like reaction conditions, and likewise cannot be definitely specified. At a reaction temperature of 175 to 200° F., a reaction time of two hours or more is indicated, while at more elevated temperatures, say 250° F., one hour is more than ample. In a commercial process, for maximum utilization of equipment, it would be preferable to employ a reaction temperature which will permit a reaction time of one hour or less, i. e., a temperature of 250° F. or over.

Because of the high reaction temperatures, gaseous sulfur dioxide is employed. The reaction is best conducted in pressure equipment, at atmospheric or superatmospheric pressures. The higher the pressure, up to a limiting pressure, the less sulfur dioxide is required. At a pressure of five pounds per square inch above atmospheric, for example, one-seventh the amount of sulfur dioxide needed at atmospheric pressure is required. Also, better hydrogen sulfide stability is obtained at higher pressures. Pressures in the range from 5 to 30 pounds per square inch above atmospheric are convenient and practical, and give very satisfactory results, and therefore are preferred.

The reaction will proceed more smoothly and the hydrogen sulfide stability of the final additive will be enhanced if the reaction is started in the presence of a small amount of water, usually at least 0.25% water by weight of the reaction mixture, or more. Large quantities are not necessary since water is produced as a by-product of the reaction, and actually for this reason it is not essential that water be added. The upper limit of the amount of water initially added is not critical, but about 1% water is the optimum employed in view of the formation of water in the course of the reaction.

As little as 0.5% (5,000 p. p. m.) by weight of the additive sulfur dioxide may be sufficient to achieve good hydrogen sulfide stability, although the amount required depends on the additive. From 1 to 1.5% (10,000 to 15,000 p. p. m.) by weight of the additive sulfur dioxide is usually preferred. Larger amounts may be used where desired, but obviously it is uneconomic to use more than the minimum required to achieve satisfactory stability. Experience has indicated that over 5% sulfur dioxide will be wasteful, and amounts in excess of this are usually avoided. These amounts are too small to effect a sulfurization of the additive. Even 10% sulfur dioxide will not under the reaction conditions increase the sulfur content of the additive to more than about 1.5% higher than that of the starting additive.

The reaction may be carried out on an additive which is either in the impure state, as taken from the reaction vessel in which it is prepared, or which has been subjected to conventional purification steps, such as solvent extraction, filtration, or treatment with activated clay, as set forth above. The additive can contain free hydrogen sulfide since, as has been stated, sulfur dioxide reacts with and eliminates free hydrogen sulfide as well as with the components present in the reaction product which generate hydrogen sulfide upon storage.

The sulfur dioxide reaction can be carried out in the presence of a diluent. If the product is oil-soluble, the diluent can be a lubricating oil. If the additive has been prepared without an oil (see column 2, starting at line 64), an oil preferably is added before the sulfur dioxide reaction. The reaction mixture preferably should comprise 25 to 75% by weight of a hydrocarbon oil of lubricating viscosity such as those available in commerce. Generally speaking, a greater proportion of such oils in the reaction mixture will result in a less severe, but more inefficient, reaction in accordance with the invention. Where the oil proportion is below 25%, low reaction temperatures within the stated range may be desirable to avoid a loss in the potency of the treated additive or reaction mixture.

In order to illustrate the invention, the following specific examples are given. Obviously, a very large number of examples of application of the process of the invention to the very large number of known phosphorus sulfide-oxygen-containing organic compounds could be given, in view of the very large number of such derivatives known to the art, but space requirements make it impossible to give more than one example each for treatment of a few specific embodiments of representative phosphorus sulfide-oxygen-containing organic compound reaction products.

EXAMPLES 1 TO 3

(1) 20 parts by weight of phosphorus pentasulfide is mixed with a portion of 100 parts of No. 225 Red Oil (a conventional acid-treated Mid-Continent lubricating oil base stock of SAE No. 20) to form a slurry, and this is mixed at 265 to 290° F. over a 1½ hour period with a mixture of 25 parts of degras (a crude grease obtained by washing sheep's wool) and 75 parts of Paratone (a polyisobutylene having an average molecular weight of about 10,000, dissolved in a neutral oil and available commercially as a lubricating oil viscosity index improvement additive) dissolved in the balance of the 100 parts of the Red Oil. The mixture is agitated for one hour at 300° F., allowed to settle and decanted. 200 parts of the Red Oil were added and the additive analyzed and found to have an ash weight of 0.44%, and to contain 3.04% sulfur.

The equipment for sulfur dioxide treatment comprised a 3,000 cc. vessel equipped with a paddle-type stirrer and an $SO_2$ inlet tube for admitting sulfur dioxide from an $SO_2$ pressure cylinder. The vessel was immersed in an oil bath through which the heat could be applied to the vessel. 1500 cc. of the solution was then placed in the pressure vessel. 0.25% water by weight of the additive was added and the vessel closed and heated at a rate of 5.7° F. per minute to the reaction temperature of 250° F. Sulfur dioxide was admitted from the tank over a 15 minute period until the pressure had reached 5 pounds per square inch above atmospheric. This pressure was maintained with the $SO_2$ line open for an additional 15 minutes, after which the flow of sulfur dioxide from the tank was cut off. Heating was continued at 250° F. for an additional 30 minutes. Thereafter, the mixture was blown with air for 30 minutes at 250° F. in order to remove water and excess $SO_2$ and filtered hot with the addition of 2% filter aid.

The final additive was analyzed for sulfur and ash, and tested by the hydrogen sulfide stability test and the ethyl motor test for engine performance, as reported below.

(2a) 23 parts of $P_2S_5$ were mixed with 50 parts of No. 225 Red Oil to form a slurry, and the slurry added to 100 parts of degras over a ½ hour period at 175 to 280° F. An additional 50 parts of No. 225 Red Oil was then added and the resulting mixture agitated for one hour at 280° F.

The additive prepared as above was then divided into two portions. One portion was mixed with 100 parts of No. 225 Red Oil to form an additive, designated as Example 2a hereinafter. This additive contained 3.38% sulfur and 0.69% ash, both by weight.

Additive 2a was then treated with sulfur dioxide exactly as set forth in Example 1.

(2b) The second portion was mixed with 4 parts barium hydroxide and 1 part calcium hydroxide. The mixture was heated for four hours at 180° F. and then for one hour at 250° F. Thereafter, the product was diluted with 100 parts of Red Oil and filtered with 5% filter aid. The resulting additive had a sulfur content of 3.25% and an ash weight of 3.04%, and was treated with sulfur dioxide exactly as in (1). The resulting additive is denoted (2b) hereinafter.

Both of these additives were then tested by the hydrogen sulfide stability test and the ethyl motor test for engine performance, as reported below.

(3) A slurry was formed of 25 parts of $P_2S_5$ and 25 parts Spermafol (hydrogenated sperm oil having an iodine value of 6 to 7, a melting point of 50 to 52° C., a free fatty acid content, as oleic, of 1 to 2%, a saponification value of 135 to 138, and about 36% of unsaponifiables) and this slurry was added to 75 parts of Spermafol at 300° F. over ¼ hour. The mixture was heated for one additional hour at the same temperature and filtered after addition of 5% filter aid. The product was then mixed with 300 parts of No. 225 Red Oil. The additive analyzed 3.51% sulfur and 0.36% ash, and was treated with sulfur dioxide exactly as set forth in (1).

The treated additive was tested by the hydrogen sulfide stability test and the ethyl motor test for engine performance, as reported below.

In the following table are compared the properties of the additives of Examples 1, 2a, 2b and 3, before and after treatment with sulfur dioxide:

Table I

| Additive of example | Sulfur [1] weight percent | Ash [2] weight percent | 8% blend in SAE 20 motor oil solubility [3] | Hours to failure at 150° F. |
|---|---|---|---|---|
| 1 Before | 3.04 | 0.44 | Clear | 16 |
| After | 3.82 | 0.78 | do | [4] 500+ |
| 2a Before | 3.38 | 0.69 | do | 16 |
| After | 4.66 | 0.96 | do | [4] 500+ |
| 2b Before | 3.25 | 3.04 | do | 64 |
| After | 3.52 | 3.03 | do | [4] 500+ |
| 3 Before | 3.51 | 0.36 | do | 16 |
| After | 3.48 | 1.10 | do | [4] 500+ |

[1] Quartz tube combustion using controlled atmosphere—See Supplement to Appendix V in 1947 Edition of "ASTM Standards on Petroleum Products and Lubricants."
[2] ASTM D-874-47-T.
[3] Visual observation through strong light.
[4] Test discontinued after 500 hours.

The improvement in hydrogen sulfide stability obtainable by sulfide dioxide treatment is outstanding, and more than adequate for normal commercial purposes. In Examples 1, 2a and 2b the sulfur and ash contents of the additives were slightly increased by the treatment, the sulfur contents of the final additives being from 0.27% to 1.28% higher.

SAE No. 20 motor oil containing 8% by weight of the treated and untreated additives of the preceding examples, as set forth in Table I above were tested in an ethyl motor under the following conditions:

Procedure_____ II.
Type engine_____ Series 30 ethyl.
Engine speed_____ 1200 R. P. M.
Sump temp_____ 300° F.
Jacket temp_____ 212° F.
Air fuel ratio_____ 15 to 1.
Compression ratio_____ 7 to 1.
Catalyst_____ None.

For comparative purposes, the test values for piston skirt, acid number, naphtha insolubles (sludge) and 1/100 the viscosity increase are added. The resulting value is termed the demerit rating.

A conventional acid-treated Mid-Continent lubricating oil base stock (SAE 20) and blended compositions of this oil made in accordance with the invention were submitted to tests in accordance with the above described ethyl motor procedure. The base oil was identical in all runs. The results in the following table are typical:

Table II

| Additive of example | | Sludge, percent | Acid number | Viscosity increase SUS at 100 | Piston skirt | Ring condition | Demerit rating | Bearing corrosion |
|---|---|---|---|---|---|---|---|---|
| 1 | Before | 1.3 | 1.2 | 92 | 5.5 | Free and clean | 8.9 | 0.108 |
|   | After  | 1.95 | 2.0 | 85 | 4.0 | do | 8.8 | 0.088 |
| 2a | Before | 1.5 | 1.2 | 79 | 5.5 | do | 9.0 | 0.058 |
|   | After  | 2.0 | 1.7 | 126 | 5.0 | do | 10.0 | 0.133 |
| 2b | Before | 1.0 | 1.5 | 111 | 2.5 | do | 6.1 | 0.048 |
|   | After  | 1.4 | 1.9 | 111 | 2.5 | do | 6.9 | 0.083 |
| 3 | Before | 0.55 | 1.0 | 57 | 3.5 | do | 5.6 | 0.080 |
|   | After  | 0.6 | 1.2 | 75 | 2.0 | do | 4.6 | 0.080 |

The data show that the $SO_2$ treatment has only a slight adverse effect on the use properties of the additives of Example 2, while the additives of Examples 1 and 3 are slightly improved.

EXAMPLE 4

Additives prepared as set forth in Examples 2a and 3 were treated with sulfur dioxide under atmospheric pressure instead of under 5 pounds per square inch superatmospheric pressure. The treated additives were denoted 4a and 4b, respectively. In this procedure, the sample was blown with $SO_2$ gas for one hour at 250° F., and then with air for ½ hour at 250° F.

The treated additives of Examples 4a and 4b, and for comparison, the untreated and treated additives of Examples 2a and 3, were tested by the 16 hour test, with the following results:

Table III

| SO₂ treating conditions | $SO_2$ consumption (g.) of additive of example number | | | | $H_2S$ stability of additive of example number [1] | | | |
|---|---|---|---|---|---|---|---|---|
| | 2a | 4a | 3 | 4b | 2a | 4a | 3 | 4b |
| Untreated | | | | | 126 | 126 | 358 | 358 |
| 5 lbs./in.² pressure of $SO_2$ (Examples 2a and 3) | 45 | | 39 | | 34.1 | | 15.7 | |
| Atmospheric pressure (examples 4a and 4b) | | 289 | | 291 | | 47.6 | | 47.7 |

[1] $H_2S$ p. p. m. after 16 hours at 150° F.—16 hour test.

Under atmospheric pressure, roughly seven times as much $SO_2$ is required as under superatmospheric pressure.

Hydrogen sulfide stability is greatly improved when the treatment is carried out at atmospheric pressure, as is evident from these results, but the stability is not improved as much as when the treatment is carried out at superatmospheric pressures.

EXAMPLE 5

A phosphorus sulfide-degras-Paratone additive was prepared as set forth in Example 1, using a reaction temperature of 300° F. and a reaction time of one hour. This was then mixed with 200 parts of No. 255 Red Oil to form an additive containing 3.93% sulfur.

One portion of additive was placed in a pressure vessel with 1% water and treated with sulfur dioxide at 200° F. under a pressure of sulfur dioxide of 10 pounds per square inch above atmospheric for one hour. The final additive was denoted 5a. It analyzed 4.2% sulfur, 0.27% higher than that of the untreated additive.

The sulfur dioxide treatment was repeated with two additional portions of the additive, one treatment being carried out at 250° F. and the other at 300° F. These additives were denoted 5b and 5c. Each analyzed 4.3% sulfur, 0.37% higher than that of the starting additive.

These additives were tested in the hydrogen sulfide stability test. The untreated additive liberated H₂S after 24 hours at 150° F., but the three treated additives failed to liberate H₂S after 758 hours at the same temperature.

Each of the sulfur dioxide-treated additives was then tested in an ethyl motor under the conditions set forth above in Examples 1 to 3, with the following results:

*Table IV*

|  | Additive prior to treatment with SO₂ | Additive after treatment with SO₂ at— | | |
|---|---|---|---|---|
|  |  | 200° F. | 250° F. | 300° F. |
|  |  | 5a | 5b | 5c |
| Used oil analysis: |  |  |  |  |
| Hours' operation | 20 | 20 | 20 | 20 |
| Sludge, percent | 0.25 | 0.20 | 0.12 | 0.20 |
| Acid number | 0.87 | 0.40 | 0.70 | 0.75 |
| Vis. increase used oil | 33 | 24 | 15 | 0.0 |
| Piston skirt number | 0.0 | 0.0 | 0.0 | 0.0 |
| Hours' operation | 40 | 40 | 40 | 40 |
| Percent sludge | 0.50 | 0.70 | 0.35 | 0.40 |
| Acid number | 1.35 | 1.40 | 1.12 | 1.25 |
| Vis. increase used oil | 55 | 85 | 50 | 21 |
| Piston skirt number | 0.0 | 0.75 | 0.5 | 0.0 |
| Hours' operation | 60 | 60 | 60 | 60 |
| Percent sludge | 1.25 | 1.75 | 2.5 | 1.95 |
| Acid number | 1.50 | 1.60 | 1.80 | 2.0 |
| Vis. increase used oil | 90 | 140 | 120 | 85 |
| Piston skirt number | 2.5 | 4.25 | 3.75 | 4.0 |
| Condition of rings | (¹) | (¹) | (¹) | (¹) |
| Engine demerit rating | 6.0 | 8.9 | 9.3 | 8.8 |
| Bearing corrosion-copper lead, mg. loss per half shell (average) | 100 | 142.8 | 56.0 | 87.9 |

¹ Free and clean.

The data show that the use properties of the additives are only slightly affected by the SO₂ treatment, and that the anti-corrosion properties are improved in the 250° and 300° F. reaction products.

EXAMPLE 6

In order to show the importance of the reaction temperature and time of the sulfur dioxide treatment in achieving hydrogen sulfide stability, portions of an additive prepared as set forth in Example 1 were treated with sulfur dioxide under a pressure of 10 pounds per square inch above atmospheric in the presence of 1% water at temperatures of 150, 200 and 250° F. for reaction times from 1 to 5 hours. These sulfur dioxide treated additives were analyzed for sulfur content and tested by the hydrogen sulfide stability test with the following results:

*Table V*

| Reaction temperature | Time (hours) | Percent S | Hours to failure |
|---|---|---|---|
|  | Initial sample | 4.3 | 0 |
| 150° F. | 1 | 4.3 | 25 |
|  | 3 | 4.3 | 60 |
|  | 5 | 4.3 | 75 |
| 200° F. | 1 | 4.3 | 25 |
|  | 3 | 4.8 | ¹ 600 |
|  | 5 | 5.0 | ¹ 600 |
| 250° F. | 1 | 4.3 | ¹ 600 |
|  | 3 | 4.6 | ¹ 600 |
|  | 5 | 5.1 | ¹ 600 |

¹ Test discontinued after 600 hours.

The data indicate that some reaction occurred at 150° F., and a little improvement in hydrogen sulfide stability is noted. The 150° F.-5 hour additive meets commercial requirements. Probably at a longer time than 5 hours the improvement would be quite marked. At 200° F., reaction took place within one hour, and very good stability was achieved at reaction temperatures of over one hour. No difference is discernible by the test used between the 200° and 250° additives as to sulfur content and hydrogen sulfide stability after 3 and 5 hours' heating at these temperatures. The maximum increase in sulfur content was 0.8%, at 250° F. after 5 hours, well above the maximum conditions to achieve stability, 200° F. for 3 hours, at which the sulfur content increase was 0.5%.

EXAMPLE 7

The importance of the presence of water at the start of the reaction was demonstrated by treating six additives prepared as set forth in Example 1 with 0.125 to 1% added water. In each case the water was charged to the pressure vessel containing the additive prior to reaction thereof and in the amount indicated in the table, over a five minute period at 250° F. A total of 15,000 p. p. m. SO₂ was then charged to the closed vessel at a steady rate for 15 minutes at 250° F. and the reaction continued for 60 minutes thereafter under a pressure of SO₂ developed therein at the same temperature. The reaction mixture was blown with air for 10 minutes at 250° F. and filtered hot with the aid of 2% filter aid. The final additives were tested by the hydrogen sulfide stability test, with the following results:

*Table VI*

| Percent water added | Hours to failure |
|---|---|
| 0.125 | 58 |
| 0.25 | 90 |
| 0.375 | 118 |
| 0.50 | 138 |
| 0.75 | 150 |
| 1.0 | 160 |

When 0.25% water is added the sulfur dioxide treated additive meets commercial requirements. The greatest improvement occurs with 1% water, at which point the benefits conferred by added water are reaching their upper limit.

These additives were tested in the ethyl motor test. The effect of added water on the use properties of the SO₂-treated additives is shown in the following table:

*Table VII*

|  | Base additive | Additive reacted with SO² and— | | | |
|---|---|---|---|---|---|
|  |  | 0% H₂O | 0.25% H₂O | 0.5% H₂O | 1% H₂O |
| Percent sludge | 1.5 | 1.8 | 1.75 | 2.0 | 1.6 |
| Acid number | 2.0 | 3.1 | 2.8 | 3.1 | 3.0 |
| Viscosity increase | 2.9 | 4.4 | 4.3 | 4.0 | 4.1 |
| Piston skirt rating | 4.0 | 4.5 | 5.0 | 4.5 | 3.5 |
| Demerit rating | 7.9 | 9.9 | 10.2 | 10.6 | 8.6 |

The data show best results are obtainable if 1% $H_2O$ is added at the start of the sulfur dioxide treatment. The demerit rating at this amount of water approaches that of the base additive. All of the treated additives give satisfactory engine performance, not appreciably below that of the base additive.

EXAMPLE 8

Following the general procedure outlined in Example 2, 35 parts of $P_2S_5$ is reacted with 100 parts myristic acid. This amount of $P_2S_5$ is found to be the optimum for preparing $P_2S_5$-myristic acid reaction products. After heating the mixture for one hour at 300° F., 100 parts of oil were added. This additive is then treated with sulfur dioxide as set forth in Example 1. The resulting additive is stable to liberation of hydrogen sulfide, as demonstrated by the hydrogen sulfide stability test.

EXAMPLE 9

20 parts of $P_2S_5$ is reacted with 25 parts Alox No. 152 (an oxidation product of paraffin wax and included a mixture of alcohols, acids, ketones and other oxidation products of paraffin, described in Patent No. 2,419,325) and 75 parts of Paratone. After heating the mixture for one hour at 300° F., 100 parts of oil were added. This additive is then treated with sulfur dioxide as set forth in Example 1. The resulting additive meets the requirements of the hydrogen sulfide stability test.

EXAMPLE 10

40 parts of Palmitone (commercial dipalmityl ketone $(C_{15}H_{31})_2CO$), 11.1 parts of phosphorus pentasulfide and 144 parts of No. 225 Red Oil (a commercial acid-treated Mid-Continent lubricating oil with an SUS viscosity of 225 at 100° F.) are mixed and heated to a temperature of 500° F. with stirring for 30 minutes in an inert atmosphere. The reaction mass is filtered hot and 190 parts of a dark-colored oily material is obtained. 95 parts of this additive are treated with sulfur dioxide as set forth in Example 1. The resulting additive meets the requirements of the hydrogen sulfide stability test.

To 95 parts of the additive are added 16 parts of barium hydroxide octahydrate. This mixture is reacted for 3 hours at a temperature of 200° F. with agitation. The mixture is then blown with air for 2 hours at a temperature of 250° F. and filtered. 91 parts of an oily solution of the barium derivative are obtained, which analyzes 3.68% ash.

This additive is treated with sulfur dioxide as set forth in Example 1, and the resulting additive is stable against liberation of hydrogen sulfide when tested by the hydrogen sulfide stability test.

EXAMPLE 11

20 parts of $P_2S_5$ is reacted with 25 parts of lauryl alcohol and 75 parts of Paratone as set forth in Example 1. The reaction product, after being treated with sulfur dioxide as set forth in Example 1, is stabilized against liberation of hydrogen sulfide and meets the requirements of the hydrogen sulfide stability test.

EXAMPLE 12

140 parts of commercial octadecane amide (analysis 75% by weight octadecane amide and 25% hexadecane amide), 55.5 parts of phosphorus pentasulfide and 420 parts of No. 225 Red Oil are mixed and heated to 500° F. in an inert nitrogen atmosphere for 30 minutes with agitation. The reaction mass is filtered hot and contains 1.4% phosphorus and 3.4% sulfur.

This reaction product, when treated with sulfur dioxide as set forth in Example 1, then meets the requirements of the hydrogen sulfide stability test.

EXAMPLE 13

5 parts of p-tert. octyl phenol are reacted with one part phosphorus pentasulfide for 4 hours at 300° F. Sludge is removed by centrifuging. The product is then treated with $SO_2$ as in Example 1. The product passes the hydrogen sulfide stability test.

EXAMPLE 14

4 parts of cyclohexanol are reacted with one part of phosphorus pentasulfide for 3½ hours at 350° F. The reaction product is centrifuged to remove unreacted materials and sludge, and is then treated with $SO_2$ as in Example 1. The product meets the requirements of the hydrogen sulfide stability test.

The above working examples of specific embodiments are for illustrative purposes only and are not intended as limitations of the invention. In view of the foregoing disclosure, the art will clearly understand the invention in its broad aspects, including variations and modifications thereof.

The process of the invention is capable of producing exceptionally odor-stable phosphorus sulfide-oxygen-containing organic compound additives. The treatment also may increase the sulfur content of these products, but if it does the sulfur content of the final additive is not more than about 1.5% higher than that of the starting additive. The treatment has, in general, little or no effect on ash content. The potency of the product in engine performance is affected only slightly, if at all, and may even be improved. Consequently, the products of the invention are of general utility as additives for oils or greases.

The amount of the final additive to be incorporated in an oil or grease will depend upon the characteristics of the oil or grease and the intended use. Some oils have more of a tendency to corrode metals or to form acids, sludges and lacquer deposits than others, and such oils require larger quantities of the addition agent. Also, oils that are intended for use at higher temperatures require larger amounts of the additive. In general, from about 1 to about 10% of the additive is employed. Under some circumstances, amounts as low as 0.01% show a significant improvement. Since the phosphorus sulfide-oxygen-containing organic compound additive is itself a lubricant, there is no upper limit. However, it may be uneconomical to include in the lubricant more of the additive than is necessary to impart the desired properties. Generally, not over 50% will be employed.

If desired, the additives of the invention may be used together with other oil addition agents, e. g., pour point depressants or film strength agents. In some instances it is desirable to include a lubricating oil containing the additive as agent for improving the clarity of the oil, e. g., lecithin, lauryl alcohol and the like, which are well known to the art, and in order to prevent foaming of the oil it is desirable in some cases to add small amounts of tetraamyl silicate, an aryl alkyl carbonate or polyalkyl silicone.

All parts and percentages in the specification and claims are by weight.

This application is a continuation-in-part of application Serial No. 316,783, filed October 24, 1952, now abandoned.

I claim:

1. A process of stabilizing phosphorus sulfide-oxygen-containing organic compound additives against generation of hydrogen sulfide which comprises treating the additive with at least about 0.5% up to about 5% sulfur dioxide at a temperature of at least about 150° F. but below a temperature at which the additive would be decomposed, and under conditions of pressure and time to effect chemical reaction between sulfur dioxide and hydrogen sulfide-producing components of the additive and produce an additive which has a sulfur content less than about 1.5% higher than that of the starting additive and which meets the requirements of the hydrogen sulfide stability test.

2. A process in accordance with claim 1 in which the reaction is carried out at a temperature of from about 175 to about 250° F.

3. A process in accordance with claim 1 which comprises adding at least 0.25% water to the reaction product prior to treatment with sulfur dioxide.

4. A process in accordance with claim 1 in which the reaction is carried out under superatmospheric pressure.

References Cited in the file of this patent
UNITED STATES PATENTS

| | | |
|---|---|---|
| 2,079,782 | Wells | May 11, 1937 |
| 2,473,195 | Cohen | June 14, 1949 |
| 2,481,487 | Adelson | Sept. 13, 1949 |
| 2,510,031 | Folda | May 30, 1950 |
| 2,637,722 | Frazier | May 5, 1953 |